June 4, 1968  W. J. PETTER ETAL  3,386,699
BALL VALVE SEAL
Filed Aug. 18, 1965  2 Sheets-Sheet 1
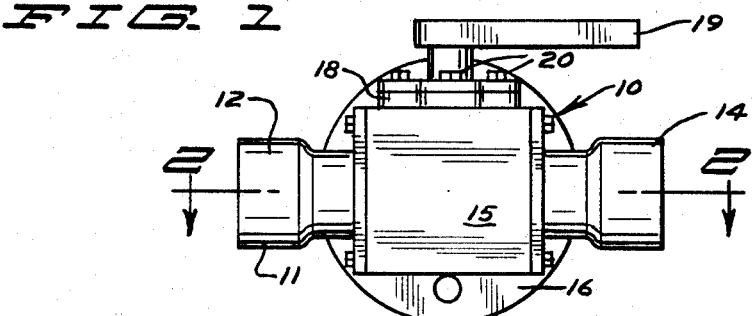
FIG. 1
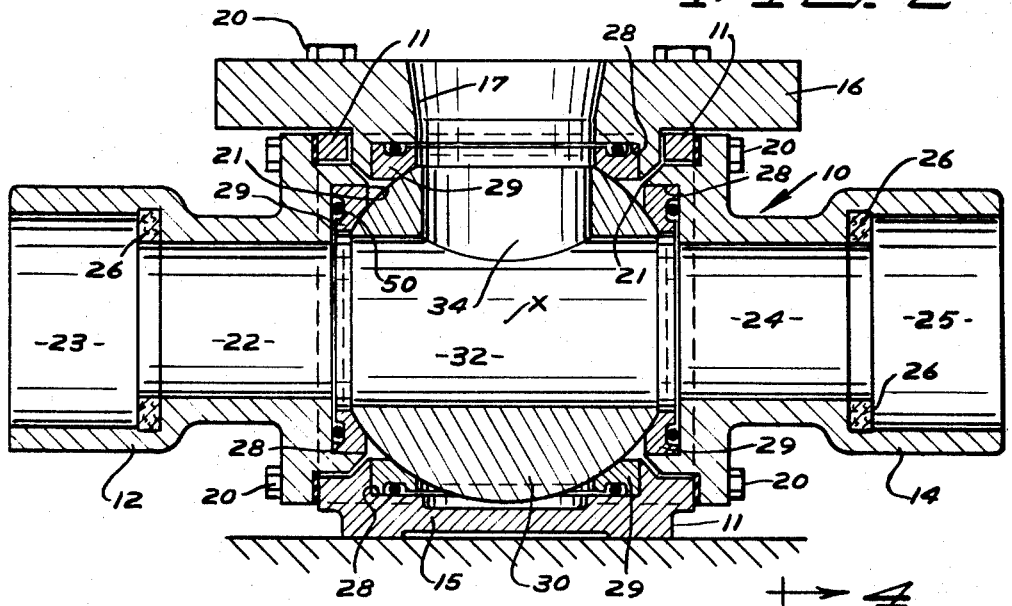
FIG. 2
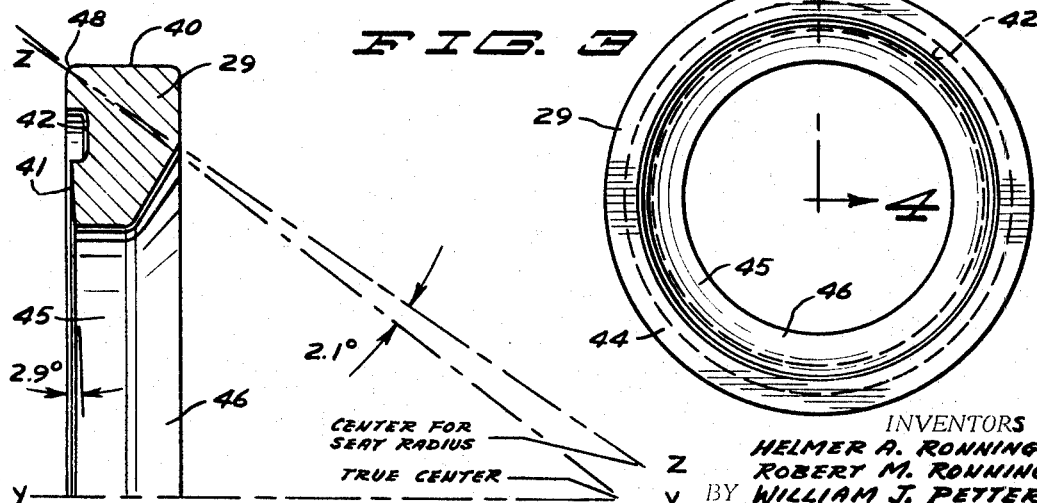
FIG. 3
FIG. 4
INVENTORS
HELMER A. RONNINGEN
ROBERT M. RONNINGEN
BY WILLIAM J. PETTER
ATTORNEYS

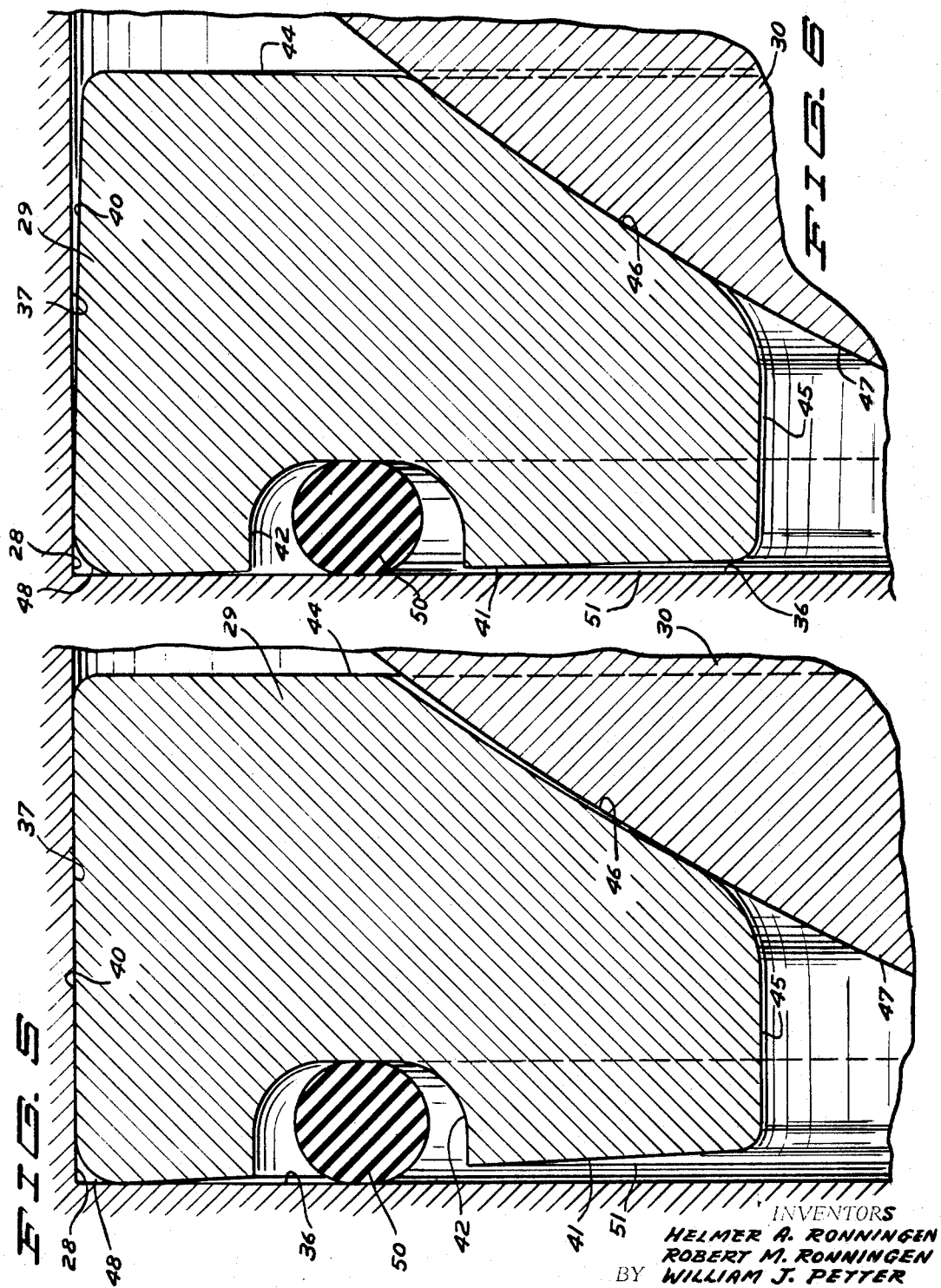

3,386,699
BALL VALVE SEAL
William J. Petter, Helmer A. Ronningen, and Robert M. Ronningen, Kalamazoo, Mich., assignors to Ronningen Manufacturing Company, Vicksburg, Mich., a corporation of Michigan
Filed Aug. 18, 1965, Ser. No. 480,719
3 Claims. (Cl. 251—315)

ABSTRACT OF THE DISCLOSURE

A ball valve sealing ring having a ball facing annular surface which is radially contoured on a radius equal to but offset from that of the ball and with the surface adapted to come into flush engagement with the ball as the ball is compressed against the ring to flex the latter about a circumferential axis.

---

This invention relates generally to rotatable ball valves and more particularly concerns the annular seals against which the ball is seated.

A ball valve commonly embodies a ball having a passage therethrough and mounted within a housing disposed in a fluid line. The ball is seated between annular seals and has a stem connection which allows the ball to be rotated between positions, while seated in the seals, to open or close fluid flow through the line. It is highly desirable to provide a seal which will effectively perform its sealing function while yet securely holding the ball against diametrical movement as fluid pressures are imposed thereon in various directions.

Ball valve sealing rings are most desirably formed of a relatively hard plastic material having a low coefficient of friction such as Teflon or nylon. In conventional valve assembly, as the end plates of the valve are pulled up, the sealing rings are compressed against the ball to provide the necessary seals thereagainst. The distortion of the seals or rings through such compression is objectionable, however, as the seal material will tend to take a set. Moreover, the seals so compressed are subject to limited cold flow and will allow some diametrical movement of the ball.

A primary object of the present invention is to provide a ball valve seal which is so shaped as to firmly trap the ball in the assembled valve in such a manner as to prohibit any seal distorting movement of the ball during operation.

Another object of the invention is to provide such a seal which is so designed as to allow the entrance of fluid pressure between the seal and its backing seat so that said pressure will aid in holding the seal in firm annular contact with the ball.

Still another object of the invention is to provide such a seal which, in the assembled valve, has an annular portion spaced away from the seal backing seat to absorb marginal tolerances which are necessary in manufacture of the various valve components.

Still another object of the invention is to provide a seal for a ball valve with a new and improved annular sealing means between the seal itself and the seal seat.

Another object of the invention is to provide a new and improved sealing ring or seal for a ball valve which affords an extremely large annular area of contact between the seal and ball without actual compressive deformation of the seal.

Still another and more specific object of the invention is to provide a seal for a ball valve wherein the seal has a ball seat face which is pre-contoured to come into flush mating engagement with the spherical surface of the ball, without radial distortion of the face, as the ball and seal are moved together under pressure to twist the seal about a circumferential axis thereof.

With these and additional objects in view the invention broadly comprises a ball valve seal having an annular surface for engagement against the spherical surface of the valve ball wherein the said annular surface is curved radially on the same radius as the spherical surface but with the center of the annular surface radius being offset from the seal center axis and toward said annular surface whereby as the seal is compressed between the ball and a backing seat the seal will uniformly flex or turn about an annular axis to bring said annular surface into flush engagement with the spherical surface.

The aforementioned objects of the invention will be brought to light during the course of the following specification, reference being made to the accompanying drawings, in which:

FIG. 1 is an elevation view of a ball valve utilizing the improved seals.

FIG. 2 is a sectional view through the valve shown in FIG. 1 and taken on line 2—2 thereof and showing the relative arrangement of the various components in an assembled valve.

FIG. 3 is a plan view of one of the seals removed from the valve.

FIG. 4 is a cross section through one-half of the seal taken on line 4—4 of FIG. 3.

FIG. 5 is an enlarged cross section through the seal shown in unstressed condition between its valve seat and the valve ball.

FIG. 6 is similar to FIG. 5 but shows the condition of the seal relative to the ball and seat with the valve assembled.

Referring now more particularly to the drawings reference characters will be used to denote like parts or structural features in the different views. The numeral 10 denotes generally a ball valve housing which includes a substantially cubical hollow body or cage 11 having opposing open sides to which are bolted the fittings 12 and 14. The front side of the cage is closed as by wall 15 while the opposite or rear side is covered by an annular flange 16 having a port 17 in the center thereof. The bottom of the cage is closed while the top is covered by bonnet 18 in which there is journaled a control handle 19. Fittings 12 and 14 as well as flange 16 and bonnet 18 are all suitably secured to the cage by means of bolts 20 as shown and together with the integral cage walls define a substantially cubical chamber 21 within the cage.

Fittings 12 and 14 are respectively provided with passageways 22 and 24 which open into chamber 21. The outer end portion of passageways 22 and 24 are enlarged as at 23 and 25 and washers 26 are provided against the shoulders therebetween enabling connection of the fittings 12 and 14 in a fluid line. The inner faces of members 12, 14, 15 and 17 facing the chamber 21 are each provided with cylindrical valve ring seats denoted generally at 28. Each seat 28 holds a ring or seal 29 formed of nylon or Teflon or similar semi-flexible material having a low coefficient of friction. A spherical ball valve 30 is disposed within chamber 21 in seating engagement with each of the rings 29. The ball 30 has a passageway 32 extending diametrically therethrough and a branch passageway 34 extending radially from the passageway 32. The control 19 is suitably connected to the ball 30 to turn the ball between different positions about the axis X (FIG. 2) to selectively open passageway 22 to port 17, passageway 22 to passageway 24, passageway 24 to port 17, or passageway 22 to port 17 and passageway 24, as shown.

As thus far described the construction is a conventional four-way ball valve arrangement. The present invention is concerned with the design of the ball valve seals 29 and their relationship to seats 28 and for a more particular description of these, attention is directed to FIGS. 3 through 6. Inasmuch as the seals and seats therefor are identical, only those on fitting 12 will be described in detail. The seat 28 has an annular back wall 36 disposed on a plane perpendicular to the axis of passageway 22 and cylindrical side wall 37 formed about the axis of said passageway. Accordingly the walls 36 and 37 meet each other at a true right angle. This also is conventional construction.

The seal 29 has an outer peripheral cylindrical wall 40 adapted to mate with and fit within the seat wall 37. The back or outer wall 41 of the ring is beveled radially inward at an angle of 2.9 degrees from a plane perpendicular to the center axis of the seal. The purpose of this bevel will be subsequently described. Wall 41 has a groove 42 therein which is somewhat greater in width than in depth. The front wall 44 is substantially parallel with wall 41 and this wall and inside wall 45 are joined by a ball engaging wall 46. The radial curvature of wall 46 is identical to the curvature of the surface 47 of the ball 30. However, the center of the arc forming surface 46 is offset from the true center axis Y—Y of the seal as shown in FIG. 4. The radius Z—Z of surface 46 is disposed at an angle of 2.1 degrees from the same radius of the true center of the ball which extends through the outer corner 48 of the seal.

A compressible O-ring 50 of rubber or other material softer than the seal 29 is disposed in the groove 42. The ring has a diameter slightly larger than the depth of the groove 42 so as to constantly provide an annular liquid seal between the seat wall 36 and the seal 29. As hereinbefore mentioned all four of the seals 29 have the same construction.

In assembling the valve all of the components are assembled as shown in FIG. 2 and the various bolts threaded loosely in place. Before the bolts are tightened the ball 30 is held rather loosely between the seals 29, as shown in FIG. 5, with the surface 46 diverging outwardly from the ball surface. As the bolts are tightened down forcing the seals 29 inwardly against the ball, each seal will bend about a circumferential axis located near corner 48 to the position shown in FIG. 6 bringing the surface 46 into flush engagement with the ball surface.

In so bending or twisting the center portion of the seal 29 will pivot outwardly with the compressed O-ring 50 being further compressed in groove 42 and as the seal so moves its outer wall 40 will move away from seat wall 37 and its wall 41 will move toward seat wall 36 narrowing the space or gap 51 between the latter walls. In certain cases where ring 50 becomes highly compressed, the ring may actually become the pivot for the seal twisting movement.

Accordingly, as the fittings are tightened down the ball becomes firmly trapped within the four surfaces 46 which are preformed to be concentric with the exterior surface of the ball. So trapped without actual compressive deformation of the seal surfaces any ball movement due to change of direction of liquid flow therethrough is reduced to a minimum.

It is significant that in twisting into position for flush seating against the ball the ring turns only 2.1 degrees and the angle (2.9 degrees) between walls 41 and 36 is commensurately reduced. This assures preservation of the slight space 51 between the wall and seal 29 inside of the O-ring 50 into which fluid may enter. This space 51 serves two useful functions. It allows for tolerances necessary in the manufacture of the various valve components which cumulatively could disturb flush seating of the ball in the seals. Secondly, it permits the ring 50 to serve as an effective liquid seal and allows fluid to enter between the seal and seat wall 36 to create an inward pressure on the seal to hold it in firm engagement with the ball 30.

The broad surface contact between the rings 29 and ball 30 prevent leakage around the ball and accomplish this without undesirable cold flow of the seal material. The cold flow, commonly found in other ball valve seals at the area of engagement between the seal and ball, is eliminated as the stress on the seal is distributed throughout the seal between the areas of contact with the ring 50 and ball 30 rather than in the immediate area of contact with the ball. This affords greater wear qualities to the seal.

The invention accordingly economically and effectively carries out the aforementioned objectives. It is understood that suitable modifications may be made in the structure as disclosed, provided such modifications come within the spirit and scope of the appended claims. Having now therefore fully illustrated and described our invention, what we claim to be new and desire to protect by Letters Patent is:

1. A ball valve seal adapted to be interposed between a ball valve and an annular seat, comprising a ring of flexible material having a low coefficient of friction, said ring having coaxial annular inner and outer walls connected at one end by an outer face adapted to face the seat and at the other end by an inner face adapted to face the ball, said inner face having an annular surface portion radially contoured on an arc having a substantially uniform radius equal to that of the ball to be engaged, the loci of the radii of curvature of said surface being spaced from the inner face of the ring and in the same direction from the outer face and lying on a circle concentric with the ring axis whereby as the ring is axially compressed between a ball valve having the same radius of curvature and a seat with the ball engaging said surface portion the ring may flex and roll about a circumferential axis substantially in said outer face to bring said surface portion into flush engagement with the ball surface.

2. The subject matter of claim 1 wherein said outer face of the ring is frusto-conical and angles toward the inner face in its extension from the outer wall to the inner wall.

3. The subject matter of claim 1 wherein the ring is provided with an annular concentric groove opening through said outer face, a second ring of resilient compressible material disposed in said groove and having a cross sectional dimension greater than the axial depth of the groove to project beyond the outer face toward the seat to serve as a pivot for said flexing when said second ring becomes highly compressed.

References Cited

UNITED STATES PATENTS

| | | | |
|---|---|---|---|
| 2,230,725 | 2/1941 | Nathan | 277—170 |
| 2,297,161 | 9/1942 | Newton | 251—315 |
| 2,981,284 | 4/1961 | Putnam | 251—317 |
| 3,042,066 | 7/1962 | Wolfensperger | 251—315 XR |
| 3,047,007 | 7/1962 | Lunken | 251—315 XR |
| 3,235,224 | 2/1966 | Grove | 251—315 XR |
| 3,269,693 | 8/1966 | Gulick | 251—315 XR |

HENRY T. KLINKSIEK, *Primary Examiner.*